United States Patent
Van Lare et al.

[15] 3,678,045
[45] July 18, 1972

[54] METHINE DYES FOR USE IN PHOTOGRAPHY

[72] Inventors: Earl J. Van Lare; Leslie G. S. Brooker, both of Rochester, N.Y.

[73] Assignee: Eastman Kodak Company, Rochester, N.Y.

[22] Filed: June 1, 1970

[21] Appl. No.: 54,070

Related U.S. Application Data

[62] Division of Ser. No. 680,974, Nov. 6, 1967, Pat. No. 3,576,640.

[52] U.S. Cl. ............................260/240.4, 96/87 R, 96/130, 96/136, 260/252
[51] Int. Cl. .................................................C07d 57/40
[58] Field of Search ...................................260/240.4, 240.6

[56] References Cited

UNITED STATES PATENTS 2,482,532  9/1949  Anish...............................260/240.4

OTHER PUBLICATIONS

Bredereck et al., Chem. Ber. vol. 96, pages 403 to 425 (1962)

*Primary Examiner*—John D. Randolph
*Attorney*—W. H. J. Kline, James R. Frederick and Ray Carter Livermore

[57] ABSTRACT

Methine dyes derived from 1-alkyl-3-alkyl-8-alkyl-9-alkylxanthine are advantageously used in photographic hydrophilic colloid layers as spectral sensitizers for silver halide and in hydrophilic colloid light filtering layers.

8 Claims, No Drawings

METHINE DYES FOR USE IN PHOTOGRAPHY

This application is a division of our copending application Ser. No. 680,974 filed Nov. 6, 1967, now U.S. Pat. No. 3,576,640 issued Apr. 27, 1971.

This invention relates to new methine dyes and their use in photographic materials.

Methine dyes such as, cyanine dyes and merocyanine dyes are well known in the art. It is known to use certain of these dyes as silver halide sensitizers and other types of these dyes as light-filtering dyes in photographic elements. Certain of the known methine dyes such as, for example, 5-chloro-1,3,3'-triethylimidazolo-thiacarbocyanine iodide, 5-chloro-1,3-diethyl-1',3',3'-iodide and 5-[(1,3-diethyl-2(3)-benzimidazolylidene)butenylidene]-3-ethylrhodanine, that are used for spectrally sensitizing silver halide emulsions are not as efficient sensitizers as are desired. Consequently, there is a continuing search for spectral sensitizing dyes having greater efficiency.

It is therefore an object of our invention to provide new novel methine dyes which are more efficient spectral sensitizers than corresponding prior art spectral sensitizers.

Another object of our invention is to provide novel cyanine dyes which are valuable spectral sensitizers for silver halide emulsions in photographic elements.

Another object of our invention is to provide novel merocyanine dyes which are valuable optical sensitizers for silver halide emulsions in photographic elements.

Still other objects of our invention will become apparent from a consideration of the following specification and examples.

these and other objects of our invention are accomplished by the synthesis and use of methine dyes of the cyanine and merocyanine classes advantageously represented by the following formulae:

I.

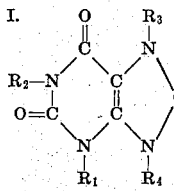

C=CH(—L=L)$_{n-1}$—C(=CH—CH)$_{m-1}$⊕—N—R$_5$ X$^\ominus$ wherein R$_1$ represents an alkyl group having from one to three carbon atoms (e.g., methyl, ethyl, propyl, etc.); R$_2$ represents an alkyl group having from one to three carbon atoms (e.g., methyl, ethyl, propyl, etc.); R$_3$ represents an alkyl group having from one to three carbon atoms (e.g., methyl, ethyl, propyl, etc); R$_4$ represents an alkyl group, especially an alkyl group having from one to 12 carbon atoms (e.g., methyl, ethyl, propyl, butyl, isoamyl, β-methoxyethyl, β-ethoxy-ethyl, benzyl, carboxymethyl, β-carboxyethyl, β-sulfoethyl, sulfopropyl, sulfobutyl, etc.); L represents a methine group —CE in which E is hydrogen, or a lower alkyl such as methyl, butyl, etc.; n represents an integer of from 1 to 4; Z represents the nonmetallic atoms required to complete a basic heterocyclic nucleus, especially a heterocyclic nucleus having from five to six atoms in the heterocyclic ring, such as a thiazole nucleus (e.g., thiazole, 4-methylthiazole, 4-phenylthiazole, 5-methylthiazole, 4,5-dimethylthiazole, 4,5-di-phenylthiazole, etc.), a benzothiazole nucleus (e.g., benzothiazole, 4-chlorobenzothiazole, 5-chlorobenzothiazole, 6-chlorobenzothiazole, 7-chlorobenzothiazole, 4-methylbenzothiazole, 6-methylbenzothiazole, 5-bromobenzothiazole, 5-methoxybenzothiazole, 6-iodobenzothiazole, 5,6-dimethoxybenzothiazole, etc.), a naphthothiazole nucleus (e.g., α-naphthothiazole, β-naphthothiazole, 5-methoxy-β-naphthothiazole, 8-ethoxy-α-naphthothiazole, β, β-naphthothiazole, etc.), a thianaphtheno-7',6',4,5-thiazole nucleus (e.g., 4'-methoxythianaphtheno-7',6',4,5-thiazole, etc.), an oxazole nucleus (e.g., 4-methyloxazole, 5-methyloxazole, 4-phenyloxazole, 4,5-diphenyloxazole, 4-ethyloxazole, 4,5-diethyloxazole, etc.), a benzoxazole nucleus (e.g., benzoxazole, 5-chlorobenzoxazole, 5-methylbenzoxazole, 5phenylbenzoxazole, 6-methylbenzoxazole, 5,6.dimethylbenzoxazole, 4,6-dimethylbenzoxazole, 5-ethoxybenzoxazole, 5,6-dichlorobenzoxazole, 5-hydroxybenzoxazole, etc.), a naphthoxazole nucleus (e.g., α-naphthoxazole, β-naphthoxazole, β,β-naphthoxazole, etc.), a selenazole nucleus (e.g., 4-methylselenazole, 4-phenylselenazole, etc.), a benzoselenazole nucleus (e.g., benzoselenazole, 5-chloro-benzoselenazole, 6-methoxybenzoselenazole, 5-hydroxybenzoselenazole, a tetrahydrobenzoselenazole, etc.), a naphthoselenazole nucleus (e.g., β-naphthoselenazole, β-naphthoselenazole, β,β-naphthoselenazole, etc.), a thiazoline nucleus (e.g., thiazoline, 4-methylthiazoline, etc.), a pyridine nucleus (e.g., 2-pyridine, 5-methyl-2-pyridine, 4-pyridine, 3-methyl-4-pyridine, etc.), a quinoline nucleus (e.g., 2-quinoline, 3-methyl-2-quinoline, 5-ethyl-2-quinoline, 6-chloro-2-quinoline; 4-methoxy-2-quinoline, 8-hydroxy-2-quinoline, 4-quinoline, 5-methyl-4-quinoline, 7-methyl-4-quinoline, 8-chloro-4-quinoline, etc.), an isoquinoline nucleus (e.g., 1-isoquinoline, 3,4-dihydro-1-isoquinoline, 3-isoquinoline, etc.), a 3,3-dialkylindolenine nucleus (e.g., 3,3-dimethylindolenine, 3,3,5-trimethylindolenine, 3,3,7-trimethylindolenine, etc.), an imidazole nucleus (e.g., imidazole, 1-alkylimidazole, 1-alkyl-4-phenylimidazole, 1-alkyl- 4,5-dimethylimidazole, etc.), a benzimidazole nucleus (e.g., benzimidazole, 1-alkylbenzimidazole, 1-arylbenzimidazole, 5,6-dichlorobenzimidazole, etc.), a naphthimidazole nucleus (e.g., 1-alkyl-α-naphthimidazole, 1-aryl-β-naphthimidazole, 1-alkyl-5-methoxy-β-naphthimidazole, etc.); m represents an integer of from 1 to 2; R$_5$ represents an alkyl group (e.g., methyl, ethyl, propyl, butyl, isoamyl, β-methoxyethyl, β-ethoxyethyl, benzyl, carboxymethyl, β-carboxyethyl, β-sulfoethyl, sulfopropyl, sulfobutyl, etc.); X$^-$ represents an anion (e.g., chloride, bromide, iodide, thiocyanate, sulfamate, methylsulfate, ethylsulfate, perchlorate, benzenesulfonate, p-toluene-sulfonate, etc.);

II.

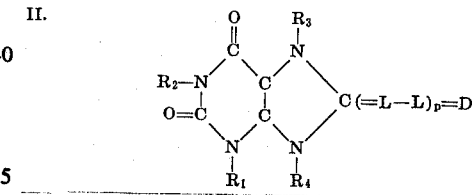

wherein R$_1$, R$_2$, R$_3$, R$_4$ and L are as defined previously; p represents an integer of from 1 to 3; and D represents an acidic nucleus (cyclic or noncyclic) derived from an active methine compound [(e.g., including a ketomethine heterocyclic nucleus, especially a heterocyclic nucleus containing four to six atoms in the heterocyclic ring such as a 3-thietanone-1,1-dioxide (e.g., 3-thietanone-1,1-dioxide, 4-methyl-3-thietanone-1,1-dioxide, 4,4dimethyl-3-thietanone-1,1-dioxide, 4,4-dipropyl-3-thietanone-1,1-dioxide, etc.), a 2-thio-2,4-thiazolidinedione, i.e., rhodanine (e.g., rhodanine, 3-ethylrhodanine, 3-sulfobutylrhodanine, 3-carboxyethylrhodanine, 3-phenylrhodanine, 3-carboxyphenylrhodanine, 3-(N,N-diethylaminoethyl)rhodanine, etc.), a hexahydro-4,6-dioxo-2-thioxopyrimidine nucleus, i.e., a 2-thiobarbituric acid nucleus (e.g., 2-thiobarbituric acid, 3-ethyl-2-thiobarbituric acid, 3-sulfobutyl-2-thiobarbituric acid, 1,3-diethyl-2-thiobarbituric acid, 3-phenyl-2-thiobarbituric acid, 1-ethyl-2-thiobarbituric acid, 1,3-disulfophenyl-2-thiobarbituric acid, etc.), a hexahydro-2,4,6-trioxopyrimidine nucleus, i.e., a barbituric acid (e.g., barbituric acid, 3-ethylbarbituric acid, 3-sulfobutylbarbituric acid, 1,3-diethylbarbituric acid, 3-phenylbarbituric acid, 1-ethyl-3-phenylbarbituric acid, 1,3-disulfophenylbarbituric acid, etc.), a 2-thio-2,4-imidazolinedione nucleus, i.e., a 2-thio-hydantoin nucleus (e.g., 2thiohydantoin, 3-ethyl-2-thiohydantoin, 1,3-diethyl-2-thiohydantoin, 3-carboxyethyl-2-thiohydantoin, 3-phenyl-1sulfobutyl-2-thiohydantoin, etc.), a 2,4-imidazolidine-dione nucleus, i.e., a hydantoin nucleus (e.g., hydantoin, 3-ethylhydantoin, 3-sulfobutylhydantoin, 3-ethyl-1-phenylhydantoin, 1-ethyl-3-sulfophenylhydantoin, 3- tolylhydantoin, etc.), a 2-thio-2,4-oxazolidinedione nucleus (e.g., 2-thio-2,4-oxazolidinedione, 3-ethyl-2-thio-2,4-oxazolidinedione, 3-butyl-2-thio-2,4-oxazolidine-dione, 3-sulfobutyl-2-thio-2,4-oxazolidinedione, 3-phenyl-2-thio-2,4-oxazolidinedione, 3-sulfophenyl-2-thio-2,4-oxazolidinedione, etc.), a 2thiazolin-4-one nucleus (e.g., 2-thiazolin-4-one, 2-diphenylamino-2-thiazolin-4-one, diethylamino-2-thiazolin-4-one, 2(N-ethyl-N-phenylamino)-2-thiazolin-4-one, etc.), a 2-pyrazolin-5-one nucleus (e.g., 2-pyrazolin-5-one, 3-methyl-1-phenyl-2-pyrazolin-5-one, 3-anilino-1-tolyl-2-pyrazolin-5-one, 1-chloro-phenyl-3-phenylcarbonamido-2-pyrazolin-5-one, etc.), a 2-imidazolin-4-one nucleus (e.g., 1-phenyl-2-thioxoimidazolin-4-one, 1-butyl-2-thioxoimidazolin-4-one, 1-methyl-2-thioxo-imidazolin-4-one, etc.), a 2-imidazolin-4-thione nucleus (e.g., increase -ethyl-1-phenyl-2-thioxoimidazolin-4-thione, 1,3-diethyl-2-thioxoimidazolin-4-thione, etc.), a 2-imidazolin-4 -selenone nucleus (e.g., 3ethyl-1-phenyl-2-thioxoimidazolin-4-selenone, 1,3-diethyl-2-thioxoimidazolin-4-selenone, etc.), an isoxazolin-5-one nucleus (e.g., isoxazolin-5-one, 3-phenyl-isoxazolin-5-one, 3-methyl-isoxazolin-5-one, etc.), a 3,5-pyrazolidinedione nucleus (e.g., 3,5-pyrazolidinedione, 1,2-diphenyl-3,5-pyrazolidinedione, 1,2-diethyl-3,5-pyrazolidinedione, 1-phenyl-2-methyl-3,5-pyrazolidinedione, etc.), a carbocyclic ring, particularly containing from four to six atoms in the ring, such as, a 1,3-cyclopentanedione (e.g., 1,3-cyclopentanedione, 5-methyl-1,3-cyclo-pentanedione, etc.), a 1,3-cyclohexanedione nucleus (e.g., 1,3-cyclohexanedione, 5-methyl-1,3-cyclohexanedione, etc.) and a non-cyclic, i.e., an open-chain compound, e.g., a malononitrile (e.g., malononitrile, phenylsulfonylacetonitrile, tolylsulfonylacetonitrile, etc.), an ester of malonic acid (e.g., dimethylmalonate, diethylmalonate, etc.), cyanoacetic acid and an ester of cyanoacetic acid (e.g., methyl ester of cyanoacetic acid, the ethyl ester of cyanoacetic acid, the propyl ester of cyanoacetic acid, etc.)].

The methine dyes of our invention are derived from a cycloammonium quaternary salt represented by the formula:

III. 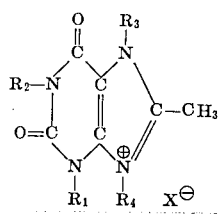

wherein $R_1$, $R_2$, $R_3$, $R_4$ and $X^-$ are as defined previously. The intermediates of Formula III are prepared advantageously by heating the corresponding base with an alkylating agent $R_4X$ in which $R_4$ and X are as defined previously. The bases used to prepare compounds of Formula III are known in the literature and are advantageously made by methods such as those described by Bredereck et al., Ber., 86, 333 (1953), Golovchinskaya, J. Gen. Chem. USSR, 30, 1183 (1960), etc.

Our methine dyes are prepared by condensing the cycloammonium quaternary salt of Formula III with the appropriate intermediate preferably in an insert solvent such as pyridine, ethanol, propanol, butanol, etc., and advantageously in the presence of a basic condensing agent such as the trialkylamines (e.g., triethylamine, tripropylamine, triamylamine, etc.), the N-alkylpiperidines (e.g., N-methylpiperidines, N-ethylpiperidines, etc.), and N,N-di-alkylaniline (e.g., N,N-dimethylaniline, N,N-diethylaniline, etc.). Heat accelerates the condensation and it is generally advantageous to conduct the condensation at a temperature between room temperature and the reflux temperature of the reaction mixture. It is to be understood that these conditions are used in all of the following general procedures for making our methine dyes even though they are not specifically recited again.

The cyanine dyes of Formula I are formed by condensing a compound of Formula III with an intermediate having the formula:

IV. 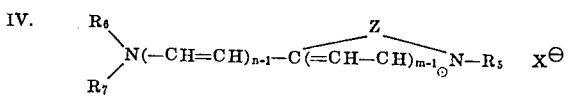

wherein $R_5$, Z, $X^-$, n and m are as defined previously; $R_6$ represents an acyl group (e.g., acetal, propionyl, benzoyl, etc.); and $R_7$ represents an aryl group (e.g., phenyl, tolyl, etc.). The dyes of Formula I in which n is the integer 2 and L contains an alkyl group are advantageously prepared by condensing a compound of Formula III described above with a compound having the formula:

V. 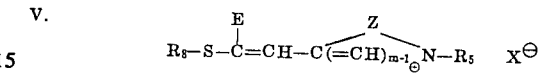

wherein E, Z, m, $R_5$ and $X^-$ are as defined previously and $R_8$ represents an alkyl group (e.g., methyl, ethyl, etc.), or an aryl group (e.g., phenyl, tolyl, etc.). The intermediates of Formula IV are well known in the art and those of Formula V are prepared according to the general method described in U.S. Pat. No. 2,315,498, issued Apr. 6, 1943.

The merocyanine dyes of Formula II are advantageously prepared by condensing an intermediate of Formula III with an intermediate of formula:

VI. 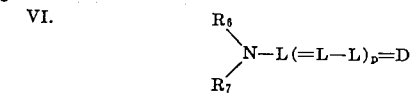

wherein $R_6$, $R_7$, L, p and D are as described previously.

Our invention is still further illustrated by the synthesis of the following typical dyes.

EXAMPLE 1

3-Ethyl-1',3',7',9'-tetramethyloxaxanthinocarbocyanine perchlorate

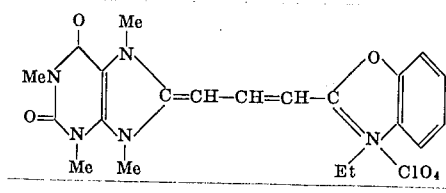

A mixture of 1 g. (1 mol.) 1,3,8,9-tetramethylxanthine and 1.86 g. (1 mol. + 100 percent excess) methyl p-toluenesulfonate is fused and then heated at about 175° for 5 minutes. To the cool melt is added 2.17 g. (1 mol.) 2-β-acetanilidovinyl-3-ethylbenzoxazolium iodide, 10 ml. of pyridine, and 1 g. (1 mol. + 100 percent excess) triethylamine and the whole mixture refluxed 5 minutes. The cooled reaction mixture is treated with 200 ml. of ether. The ether layer is decanted from the precipitated solid and the solid washed with ether by decantation. The solid is suspended in 50 ml. of hot water to which is added a solution of 3 g. sodium perchlorate in 10 ml. of water. After chilling, the crystalline dye is filtered off, washed with ethyl alcohol and dried. After two recrystallizations from methyl alcohol, 0.3 g. (12 percent) of pure dye is obtained, m.p. 278°–279° C dec.

EXAMPLE 2

3-Ethyl-1',3',7',9'-tetramethylthiaxanthinocarbocyanine iodide crystalline dec.

A mixture of 1 g. (1 mol.) 1,3,8,9-tetramethylxanthine and 1.86 g. (1 mol. + 100 percent excess) methyl p-toluenesulfonate is fused and then heated at about 175° for 5 minutes. To the cool melt is added 2.25 g. (1 mol.) 2-β-acetanilidovinyl-3-ethyl-benzothiazolium iodide, 10 ml. of pyridine and 1 g. (1 mol. + 100 percent excess) triethylamine and the mixture refluxed 5 minutes. After chilling, the crystalline dye is filtered off and washed with acetone. After two recrystallizations from methyl alcohol, 1.1 g. (41 percent) of pure dye is obtained, m.p. 222°–223° C dec.

EXAMPLE 3

3-Ethyl-5-[(1,3,7,9-tetramethyl-8(9H)-xanthinylidene) ethylidene]rhodanine

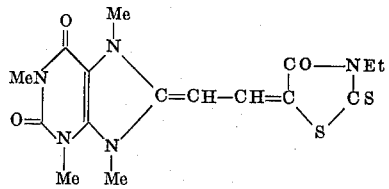

A mixture of 1 g. (1 mol.) 1,3,8,9-tetramethylxanthine and 1.86 g. (1 mol. + 100 percent excess) methyl p-toluenesulfonate is fused and then heated at about 175° for 5 minutes. To the cool malt is added 1.6 g. (1 mol.) 5-acetanilidomethylene-3-ethyl-rhodanine, 10 ml. of pyridine and 1 g. (1 mol. + 100 percent excess) triethylamine, and the mixture refluxed 15 minutes. The cooled reaction mixture is treated with 200 ml. of ether. The ether layer is decanted from the precipitated solid, and the solid is washed with ether by decantation. The solid is treated with ethyl alcohol from which the dye crystallized. The dye is filtered off and washed with ethyl alcohol. The dye is purified by precipitation from a pyridine solution with methyl alcohol. The yield of pure dye is 0.3 g. (15 percent), m.p. 272°–273° C dec.

EXAMPLE 4

1,1′,3,3,3′,7′,9′Heptamethylindoxanthinocarbocyanine iodide

A mixture of 1 g. (1 mol.) of 1,3,8,9-tetramethylxanthine and 3.3 g. (1 mol. + 250 percent excess) of methyl p-toluenesulfonate is fused and then heated to about 200° C for 2 minutes. To the cool melt is added 2.15 g. (1 mol.) of 2-β-acetanilidovinyl-1,3,3-tri-methyl-3H-indolium iodide, 10 ml. of pyridine and 1 g. (1 mol. + 100 percent excess) of triethylamine and the mixture refluxed 2 minutes. After chilling, the solution is filtered to remove a pale yellow solid which is discarded. The filtrate is concentrated to dryness and this residue dissolved in a small amount of chloroform. The chloroform solution is chromatographed on alumina, and the column washed with chloroform until the eluate is free of blue dye. The proper dye is eluted with methyl alcohol. The methyl alcoholic solution is concentrated to a small volume and treated with an aqueous solution of sodium perchlorate. The dye is purified by recrystallization from ethyl alcohol. The pure dye is obtained in a 4 percent yield as brownish crystals, m.p. 220°–221° C dec.

EXAMPLE 5

3-Ethyl-1′,3′,7′,9′-tetramethylselenaxanthinocarbocyanine iodide

A mixture of 1 g. (1 mol.) of 1,3,8,9-tetramethyl-xanthine and 3.3 g. (1 mol. + 250 percent excess) of methyl p-toluenesulfonate is fused and then heated to about 200° C. for 2 minutes. To the cool melt is added 2.3 g. (1 mol.) of 2-β-anilidovinyl-3-ethylbenzoselenazolium iodide, 10 ml. of pyridine, 0.5 g. (1 mol.) of acetic anhydride and 1.5 g. (2 mols. + 50 percent excess) of triethylamine and the mixture refluxed 15 minutes. After chilling, the crystalline dye is filtered off and washed with ethyl alcohol. After two recrystallizations from methyl alcohol, 0.5 g. (18 percent) of pure dye is obtained as reddish orange crystals, m.p. 220°–221° C dec.

EXAMPLE 6

Anhydro-1′,3′,7′,9′-tetramethyl-3-(3-sulfopropyl)-4,5-benzothiaxanthinocarbocyanine hydroxide A mixture of 1 g. (1 mol.) of 1,3,8,9-tetramethylxanthine and 3.3 g. (1 mol. + 250 percent excess) of methyl p-toluenesulfonate is fused and then heated to about 200° C for 2 minutes. To the cool melt is added 2.1 g. (1 mol.) of an- hydro-2-β-anilinovinyl-1-(3-sulfopropyl)naphtho[1,2-d]thiazolium hydroxide, 10 ml. of dimethylacetamide, 0.5 g. (1 mol.) of acetic anhydride and 1.5 g. (2 mols. + 50 percent excess) of triethylamine and the mixture refluxed for 5 minutes. After chilling, the solid is filtered off and washed with methyl alcohol. The solid is extracted three times with 100 ml. portions of boiling methyl alcohol, and further purified by precipitation from a cresol solution with methyl alcohol. Pure dye is obtained in a 21 percent yield as bluish-black crystals, m.p. 244°–245° C dec.

EXAMPLE 7

3-Ethyl-1′,3′,7′,9′tetramethylthiaxanthinodicarbocyanine iodide

A mixture of 1 g. (1 mol.) of 1,3,8,9-tetramethylxanthine and 3.3 g. (1 mol. + 250 percent excess) of methyl p-toluenesulfonate is fused and heated to about 200° C for 2 minutes. To the cool melt is added 2.4 g. (1 mol.) of 2-(4-acetanilido-1,3-butadienyl)-3-ethylbenzothiazolium iodide, 10 ml. of pyridine and 1 g. (1 mol. + 100 percent excess) of triethylamine and the mixture refluxed 15 minutes. After chilling, the crude dye is filtered off and washed with methyl alcohol. After two recrystallizations from methyl alcohol, 0.6 g. (21 percent) of pure dye is obtained as dark green crystals, m.p. 225°–226° C dec.

EXAMPLE 8

3-Ethyl-5-[(1,3,7,9-tetramethyl-8(9H)-xanthinylidene) ethylidene]-2-thio-2,4-oxazolidinedione A mixture of 1 g. (1 mol.) of 1,3,8,9-tetramethylxanthine and 3.3 g. (1 mol. +250 percent excess) of methyl p-toluenesulfonate is fused and then heated to about 200° C for 2 minutes. To the cool melt is added 1.5 g. (1 mol.) of 5-acetanilidomethylene-3-ethyl-2-thio-2,4-oxazolidinedione, 10 ml. of pyridine and 1 g. (1 mol. + 100 percent excess) of triethylamine and the mixture refluxed 90 minutes. After chilling, the crude dye is filtered off and washed with ethyl alcohol. The dye is purified by precipitation from a pyridine solution with methyl alcohol. The pure dye is obtained in a 21 percent yield as red crystals, m.p. 270°–271° C dec.

EXAMPLE 9

3-Methyl-1-phenyl-4-[(1,3,7,9-tetramethyl-8(9H)-xanthinylidene)ethylidene]-2-pyrazolin-5-one.

A mixture of 1 g. (1 mol.) of 1,3,8,9-tetramethylxanthine and 3.3 g. (1 mol. + 250 percent excess) of methyl p-toluenesulfonate is fused and then heated to about 200° C for 2 minutes. To the cool melt is added 1.4 g. (1 mol.) of 4-anilinomethylene-3-methyl-1-phenyl-2-pyrazolin-5-one, 10 ml. of pyridine, 0.5 g. (1 mol.) of acetic anhydride, and 1.5 g. (2 mols. + 50 percent excess) of triethylamine and the mixture refluxed 90 minutes. After chilling, the solid is filtered off and washed with ethyl alcohol. The dye is purified by precipitation from a pyridine solution with methyl alcohol. The pure dye is obtained in a 22 percent yield as deep yellow crystals, m.p. 291°–292° C dec.

EXAMPLE 10

3-Phenyl-4-[(1,3,7,9-tetramethyl-8(9H)-xanthinylidene) ethylidene]-2-isoxazolin-5-one A mixture of 1 g. (1 mol.) of 1,3,8,9-tetramethylxanthine and 3.3 g. (1 mol. + 250 percent excess) of methyl p-toluenesulfonate is fused and then heated to about 200° C for 2 minutes. To the cool melt is added 1.3 g. (1 mol.) of 4-anilinometylene-3-phenyl-2-ixoxazolin-5-one, 10 ml. of pyridine, 0.5 g. (1 mol.) of acetic anhydride, and 1.5 g. (2 mols. + 50 percent excess) of triethylamine and the mixture refluxed 90 minutes. After chilling, the crude dye is filtered off and washed with ethyl alcohol. The dye is purified by precipitation from a pyridine solution with methyl alcohol. The pure dye is obtained in a 20 percent yield as yellow crystals, m.p. 283°–284° C dec.

EXAMPLE 11

1,2-Diphenyl-4-[(1,3,7,9-tetramethyl-8(9H)-xanthinylidene)ethylidene]-3,5-pyrazolidinedione.

A mixture of 1 g. (1 mol.) of 1,3,8,9-tetramethylxanthine and 3.3 g. (1 mol. + 250 percent excess) of methyl p-toluenesulfonate is fused and then heated to about 200° C for 2 minutes. To the cool melt is added 1.8 g. (1 mol.) of 4-anilinomethylene-1,2-diphenyl-3,5-pyrazolidinedione, 10 ml. of pyridine, 0.5 g. (1 mol.) of acetic anhydride, and 1.5 g. (2 mols. + 50 percent excess) of triethylamine and the mixture refluxed 90 minutes. After chilling, the solution is filtered from colorless solid, and then treated with 300 ml. of water. The solid is separated by filtration and then dissolved in 20 ml. of ethyl alcohol. After chilling, the crude dye is filtered off and washed with ethyl alcohol. After two recrystallizations from methyl alcohol, 0.15 g. (5 percent) of pure dye is obtained as yellow crystals, m.p. 278°–280° C dec.

EXAMPLE 12

1,3-Diethyl-5-[(1,3,7,9-tetramethyl-8(9H)-xanthinylidene)ethylidene]-2-thiobarbituric acid A mixture of 1 g. (1 mol.) of 1,3,8,9-tetramethylxantine and 3.3 g. (1 mol. + 250 percent excess) of methyl p-toluenesulfonate is fused and then heated to about 200° C for 2 minutes. To the cool melt is added 1.5 g. (1 mol.) of 5-anilinomethylene-1,3-diethyl-2-thiobarbituric acid, 10 ml. of pyridine, 0.5 g. (1 mol.) of acetic anhydride, and 1.5 g. (2 mols. + 50 percent excess) of triethylamine and the mixture refluxed 90 minutes. After chilling, the crude dye is filtered off and washed with ethyl alcohol. The dye is purified by precipitation from a pyridine solution with methyl alcohol. The pure dye is obtained in a 12 percent yield as yellow needles, m.p. 294°–295° C dec.

EXAMPLE 13

3-Ethyl-5-[(1,3,7,9-tetramethyl-8(9H)-xanthinylidene)-2-butenylidene]rhodanine.

A mixture of 1 g. (1 mol.) of 1,3,8,9-tetramethylxanthine and 3.3 g. (1 mol. +250 percent excess) of methyl p-toluenesulfonate is fused and then heated to about 200° C for 2 minutes. To the cool melt is added 1.7 g. (1 mol.) of 5-(3-acetanilidoallylidene)-3-ethylrhodanine, 10 ml. of pyridine and 1 g. (1 mol. + 100 percent excess) of triethylamine and the mixture refluxed 60 minutes. After chilling, the crude dye is filtered off and washed with methyl alcohol. After two recrystallizations from pyridine, 0.15 g. (5 percent) of pure dye is obtained as dark green crystals, m.p. 258°–259° C dec.

EXAMPLE 14

1',3,3',7',9'-Pextaethylthiaxanthinocyanine iodide

Dye 14 is advantageously prepared by a method similar to that described for Dye 2 except that an equimolar amount of 1,3,8,9-tetraethylxanthine is used in place of 1,3,8,9-tetramethylxanthine to make the quaternary salt and this is then reacted with an equimolar amount of 1-ethyl-2-phenylthiobenzothiazolium iodide in place of 2-β-acetanilidovinyl-3-ethylbenzothiazolium iodide. The crude dye is isolated and purified by recrystallization as described for Dye 2.

EXAMPLE 15

3-Ethyl-1',3',7',9'-tetramethylthiaxanthinotricarbocyanine iodide

Dye 15 is advantageously prepared by a method similar to that described for Dye 2 except that an equimolar amount of 2-(5-acetanilido-2,4-pentadeienyl)-3-ethylbenzothiazolium iodide is used in place of 2-β-acetanildovinyl-3-ethylbenzothiazolium iodide.

EXAMPLE 16

3-Ethyl-5-[(1,3,7,9-tetramethyl-8(9H)-xanthinylidene)-2,4-hexadienylidene]rhodanine Dye 16 is advantageously prepared by a method similar to that described for Dye 13 except that an equimolar amount of 5-(5-acetoanilidopenta-2,4-dienylidene)-3-ethylrhodanine is used in place of 5-(3-acetanilidoallylidene)-3-ethylrhodanine.

Similarly other dyes of Formulas I and II are advantageously prepared and used according to our invention.

The intermediates of Formula VI are well known in the art.

Our dyes are used to advantage to spectrally sensitize photographic silver halide emulsions. Our photographic emulsions contain any of the silver halides or mixtures thereof dispersed in any of the hydrophilic colloids used in photographic emulsions including natural materials, e.g., gelatin, albumin, agar-agar, gum arabic, alginic acid, etc., and synthetic materials, e.g., polyvinyl alcohol, polyvinyl pyrrolidone, cellulose ethers, partially hydrolyzed cellulose acetate, etc. Our dyes are especially useful for extending the spectral sensitivity of the customarily employed gelatino-silver-chloride, gelatino-silver-chlorobromide, gelatino-silver-bromide, and gelatino-silver-bromo-iodide emulsions. To prepare emulsions sensitized with one or more of the novel dyes, it is only necessary to disperse the dye or dyes in the emulsions. The methods of incorporating dyes in emulsions are simple and are known to those skilled in the art. In practice, it is convenient to add the dyes to the emulsions in the form of a solution in an appropriate solvent. A mixture of methyl alcohol and pyridine is advantageously employed as a solvent. The dyes are advantageously incorporated in the finished, washed emulsions and should be uniformly distributed throughout the emulsions. The particular solvent used will, of course, depend on the solubility properties of the particular dye.

The concentration of the dyes in the emulsions can vary widely, e.g., from 5 to 100 mg. per liter of flowable emulsion. The concentration of the dyes will vary according to the type of emulsion and according to the effect desired. The suitable and most economical concentration for any given emulsion will be apparent to those skilled in the art, upon making the ordinary tests and observations customarily used in the art of emulsion making. To prepare a gelatino-silver-halide emulsion sensitized with one or more of our dyes, the following procedure is satisfactory.

A quantity of dye is dissolved in a mixture of methanol and pyridine and a volume of this solution, which may be diluted with water, containing from 5 to 100 mg. of dye, is slowly added to about 1,000 cc. of gelatino-silver-halide emulsion, with stirring is continued until the dye is thoroughly dispersed in the emulsion.

With most of the dyes, from 10 to 20 mg. of dye per liter of gelatino-silver-bromide or bromoiodide emulsion (containing about 40 g. of silver halide) suffices to produce the maximum sensitizing effect. With the finer grain emulsions, a somewhat larger concentration of dye may be needed to produce the maximum sensitizing effect.

The above statements are only illustrative, as it will be apparent that the dyes can be incorporated in photographic emulsions by any of the other methods customarily employed in the art, e.g., by bathing a plate or film upon which an emulsion is coated in a solution of the dye in an appropriate solvent. However, bathing methods are ordinarily not to be preferred. Emulsions sensitized with the dyes can be coated on suitable supports, such as glass, cellulose derivative film, resin film or paper in the usual manner.

Photographic silver halide emulsions, such as those listed above, containing the sensitizing dyes of this invention can also contain such addenda as chemical sensitizers (e.g., sulfur sensitizers, such as allyl thiocarbamide, thiourea, allylisothiocyanate, cystine, etc.), various gold compounds (such as potassium chloroaurate, auric trichloride, etc.) (see U.S. Pat. Nos. 2,540,085; 2,597,856; and 2,597,915, for example), various palladium compounds (such as palladium chloride (U.S. Pat. No. 2,540,086), potassium chloropalladate (U.S. Pat. No. 2,598,079), etc., or mixtures of such sensitizers), antifoggants (e.g., benzotriazole, nitrobenzimidazole, 5-nitroindazole, etc. (see Mees: "The Theory of the Photographic Process," Mac- Millan Pub. 1942, p. 460), or mixtures thereof), hardeners (e.g., formaldehyde (U.S. Pat. No. 1,763,533), chrome alum (U.S. Pat. No. 1,763,533), glyoxal (German Pat. No. 538,713), dibromacrolein (Great Britain Pat. No. 406,750), etc.), color couplers (e.g., such as those described in U.S. Pat. No. 2,423,730, Spence and Carroll U.S. Pat. No. 2,640,776, issued June 2, 1953, etc.), or mixtures of such addenda. Dispersing agents for color couplers, such as substantially water-insoluble, high boiling crystalloidal materials, such as those set forth in U.S. Pat. Nos. 2,322,027 and 2,304,940, can also be employed in the above-described emulsions.

EXAMPLE A

In the manner described above, a number of the dyes of this invention represented by Formula I above are separately incorporated in an ordinary gelatino-silver-chlorobromide or gelatino-silver-bromoiodide emulsion (of the types described by Trivelli and Smith in Photo. Journal, 79, 330 (1939)), the dyes being added in the form of a solution. The dyes are then thoroughly incorporated in the emulsions by stirring. After a short digestion, the emulsions are coated onto ordinary cellulose acetate film supports and the coatings exposed in a spectrograph and sensitometer and then developed in Kodak D–19 developer solution and fixed in an alkaline thiosulfate bath. The sensitizing range and maximum absorption for several typical dyes are indicated in the following table.

| Dye of Example | Silver Halide Emulsion | Sensitization Range in m$\mu$ | Sensitization Max. in m$\mu$ |
| --- | --- | --- | --- |
| 1 | Silver chlorobromide | to 565 | 520 |
| 2 | do | to 605 | 555 |
| 3 | do | to 660 | 580 |
| 4 | Silver bromoiodide | to 580 | 530 |
| 5 | do | to 620 | 550 |
| 6 | do | to 625 | 570 |
| 7 | do | to 720 | 640 |

| Dye of Example | Silver Halide Emulsion | Sensitization Range in m$\mu$ | Sensitization Max. in m$\mu$ |
| --- | --- | --- | --- |
| 8 | do | to 580 | 530 |
| 9 | Silver chloride | to 530 | 460 |
| 10 | do | to 490 | 440 |
| 11 | do | to 490 | 430 |
| 12 | do | to 540 | 470 |
| 13 | Silver bromoiodide | to 710 | 670 |

The following examples will illustrate the technical advance provided by use of our dyes which are more efficient sensitizers than corresponding prior art dyes to yellow light.

EXAMPLE B

Another gelatino-silver bromoiodide emulsion of the type described by Trivelli and Smith is divided into two equal portions, one being sensitized with prior art dye 5-chloro-1,3,3'-triethyl-benzimidazolo-thiacarbocyanine iodide, identified as Dye A, and the other being sensitized with our Dye 2 (Example 2), the dye concentration being 0.08 g. per mole of silver halide in each emulsion. Coatings made as described in Example A one set being exposed in a spectrograph, and the other set being exposed in a sensitometer to light passed through a Wratten (Eastman Kodak Company's registered trademark) No. 6 filter (a yellow colored filter) are processed as described in Example A. The relative speed produced in the emulsion sensitized with Dye A is set at 100 for the control. The following table summarizes the results.

| Dye | Sensitization Max. in m$\mu$ | Sensitization Range in m$\mu$ | Relative Speed minus blue |
| --- | --- | --- | --- |
| A | 550 | to 620 | 100 |
| 2 | 550 | to 620 | 276 |

Our Dye 2 is a substantially more efficient sensitizer to yellow light than prior art Dye A.

EXAMPLE C

Example B is repeated using prior art dye 5-chloro-1,3-diethyl-1',3',3'-trimethylbenzimidazoloindolocarbocyanine iodide, identified as Dye B, as the control in a comparison with our Dye 4 (Example 4). The results are summarized in the following table.

| Dye | Sensitization Max. in m$\mu$ | Sensitization Range in m$\mu$ | Relative Speed minus blue |
| --- | --- | --- | --- |
| B | 530 | to 560 | 100 |
| 4 | 530 | to 560 | 159 |

Our Dye 4 is a substantially more efficient sensitizer to yellow light than prior art Dye B.

EXAMPLE D

Example B is repeated using prior art dye 5-[(1,3-diethyl-2(3)-benzimidazolylidene)butenylidene]-3-ethylrhodanine identified as Dye C as the control in a comparison with our Dye 13. In this example the two dyes are used at a concentration of 0.04 g. per mole of silver halide. The results are summarized in the following table.

| Dye | Sensitization Max. in m$\mu$ | Sensitization Range in m$\mu$ | Relative Speed minus blue |
| --- | --- | --- | --- |
| C | 630 | to 700 | 100 |
| 13 | 630 | to 700 | 263 |

Our Dye 13 is a substantially more efficient sensitizer to yellow light than prior art Dye C.

Similarly it can be shown that the other dyes of our invention are valuable spectral sensitizers for use in photography.

Our dyes are advantageously used in hydrophilic colloid layers of photographic elements as light-screening layers.

The light-screening layers of our invention are prepared by coating on the photographic element or on its support, by method well known in the art, a water solution of the dye, a hydrophilic colloid binder and a coating aid such as saponin. In addition to these materials it is advantageous to add a basic mordant to this solution to render the acid dye nonwandering. For most purposes it is desirable to add agents to harden the colloidal binder material so that the light-screening layer will remain intact in the photographic element during and following the processing operation. The pH of the coating solution is adjusted when necessary to a level that is compatible with the light-sensitive emulsion layer by the usual methods.

The proportions of dye, colloidal binder, mordant, hardener, coating aid used in making our light-screening layers may be varied over wide ranges and will depend upon the specific requirements of the photographic element being produced. The methods used to determine the optimum composition are well known in the art and need not be described here.

The light-sensitive layer or layers and the light-screening layer or layers of the photographic element may be coated on any suitable support material used in photography such as cellulose nitrate, cellulose acetate, synthetic resin, paper, etc.

Hydrophilic colloidal materials used as binders include collodion, gum arabic, cellulose ester derivatives such as alkyl esters of carboxylated cellulose, hydroxy ethyl cellulose, carboxy methyl hydroxy ethyl cellulose, synthetic resins, such as the amphoteric copolymers described by Clavier et al in U.S. Pat. No. 2,949,442, issued Aug. 16, 1960, polyvinyl alcohol, and others well known in the art. The above-mentioned amphoteric copolymers are made by polymerizing the monomer having the formula:

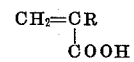

wherein R represents an atom of hydrogen or a methyl group, and a salt of a compound having the general formula:

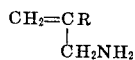

wherein R has the above-mentioned meaning, such as an allylamine salt. These monomers can further by polymerized with a third unsaturated monomer in an amount of 0 to 20 percent of the total monomer used, such as an ethylene monomer that is copolymerizable with the two principal monomers. The third monomer may contain neither a basic group nor an acid group and may, for example, be vinyl acetate, vinyl chloride, acrylonitrile, methacrylonitrile, styrene, acrylates, methacrylates, acrylamide, methacrylamide, etc. Examples of these polymeric gelatin substitutes are copolymers of allylamine and methacrylic acid; copolymers of allylamine, acrylic acid and acrylamide; hydrolyzed copolymers of allylamine, methacrylic acid and vinyl acetate; copolymers of allylamine, acrylic acid and styrene; the copolymer of allylamine, methacrylic acid and acrylonitrile; etc.

Our dyes are generally added to the water-permeable colloidal binder in water solution. In some instances it may be advantageous to form an alkali metal salt of the dye by dissolving the dye in a dilute aqueous alkali metal carbonate solution, for example. Usually a coating aid, such as saponin, is added to the dyed colloidal suspension before coating it as a layer on the photographic element. The dyes having acidic groups, e.g., sulfo, carboxy, etc., are advantageously mordanted with a suitable basic mordant added to the colloidal suspension before coating.

Basic mordants that may be used include the basic mordants described by Minsk in U.S. Pat. No. 2,882,156, issued Apr. 14, 1959, prepared by condensing a polyvinyloxo-compound such as a polyacrolein, a poly-γ-methylacrolein, a polyvinyl alkyl ketone, such as polyvinyl methyl ketone, polyvinyl ethyl ketone, polyvinyl propyl ketone, polyvinyl butyl ketone, etc., or certain copolymers containing acrolein, methacrolein, or said vinyl alkyl ketone components, for example, 1 to 1 molar ratio copolymers of these components with styrene or alkyl methacrylates wherein the alkyl group contains from one to four carbon atoms, such as methyl, ethyl, propyl, or butyl methacrylates in the proportions from about 0.25 to 5 parts by weight of the said polymeric oxo-compound with one part by weight of an aminoguanidine compound such as aminoguanidine bicarbonate, aminoguanidine acetate, aminoguanidine butyrate, etc.; the reaction products of polyvinyl-sulfonates with C-aminopyridines of Reynolds et al U.S. Pat. No. 2,768,078, issued Oct. 23, 1956, prepared by reacting alkyl and aryl polyvinyl sulfonates prepared as described in our patents U.S. Pat. No. 2,531,468 and U.S. Pat. No. 2,531,469, both dated Nov. 28, 1950, under controlled conditions with C-aminopyridines or alkyl group substituted C-aminopyridines such as 2-amionpyridine, 4-aminopyridine, the aminopicolines such as 2-amino-3-methylpyridine, 2-amino-4-methyl-pyridine, 2-amino-5-methylpyridine, 2-amino-6-methylpyridine and corresponding 4-aminomethyl derivatives which react in this reaction in exactly the same way, 2-maino-6-ethylpyridine, 2-amino-6-butylpyridine, 2-amino-6-amylpyridine, etc., the various aminolutidines such as, for example, 4-amino-2,6-dimethylpyridine and the various aminocollidines such as, for example, 2-amino-3-ethyl-4-methylpyridine, etc.; the dialkylaminoalkyl esters or dialkylaminoalkylamino amides, e.g., such as those described by Carroll et al. U.S. Pat. No. 2,675,316, issued Apr. 13, 1954, prepared by reacting addition polymers containing carboxyl groups with a basic dialkylamino compound, for example, N-dialkyl amine ethyl esters of polymers or copolymers containing carboxyl groups; the addition type polymers containing periodically occurring quaternary groups of Sprague et al. U.S. Pat. No. 2,548,564, issued Apr. 10, 1951, including quaternary ammonium salts of vinyl substituted azines such as vinylpyridine and its homologs such as vinylquinoline, vinylacridine, and vinyl derivatives of other six-membered heterocyclic ring compounds containing hydrogen atoms. These addition polymers include 2-vinylpyridine polymer metho-p-toluenesulfonate, 4-vinylpyridine polymer metho-p-toluenesulfonate.

Hardening materials that may be used to advantage in-clude such hardening agents as formaldehyde; a halogen-substituted aliphatic acid such as mucobromic acid as described in White U.S. Pat. No. 2,080,019, issued May 11, 1937; a compound having a plurality of acid anhydride groups such as 7,8-diphenylbicyclo (2,2,2)-7-octene-2,3,5,6-tetra-carboxylic dianhydride, or a dicarboxylic or a disulfonic acid chloride such as terephthaloyl chloride or naphthalene-1,5-disulfonyl chloride as described in Allen and Carroll, U.S. Pat. Nos. 2,725,294 and 2,725,295, both issued Nov. 29, 1955; a cyclic 1,2-diketone such as cyclopentane-1,2-dione as described in Allen and Byers U.S. Pat. No. 2,725,305, issued Nov. 29, 1955; a bisester of methane-sulfonic acid such as 1,2-di(methanesulfonoxy)-ethane as described in Allen and Laakso U.S. Pat. No. 2,726,162, issued Dec. 6, 1955; 1,3-dihydroxymethylbenzimidazol-2, one as described in July, Knott and Pollak U.S. Pat. No. 2,732,316, issued Jan. 24, 1956; a dialdehyde or a sodium bisulfite derivative thereof, the aldehyde groups of which are separated by two to three carbon atoms, such as β-methyl glutaraldehyde bis-sodium bisulfite as described in Allen and Burness, U.S. patent application Ser. No. 556,031, filed Dec. 29, 1955, and now abandoned; a bis-aziridine carboxamide such as trimethylene bis(1-aziridine carboxamide) as described in Allen and Webster, U.S. Pat. No. 2,950,197, issued Aug. 23, 1960; or 2,3-dihydroxydioxane as described in Jeffreys U.S. Pat. No. 2,870,013, issued Jan. 20, 1959.

The photographic element utilizing our light-screening layers have light-sensitive emulsion layers containing silver chloride, silver bromide, silver chlorobromide, silver iodide, silver bromoiodide, silver chlorobromoiodide, etc., as the light-sensitive material. Any light-sensitive silver halide emulsion layers may be used in these photographic elements. The silver halide emulsion may be sensitized by any of the sensitizers commonly used to produce the desired sensitometric characteristics. Our light-screening layers are advantageously used in antihalation layers either on the side of the support away from the light-sensitive layers or between the support and the light-sensitive layers (s), between one or more light-sensitive layers.

The invention has been described in detail with particular embodiments thereof, but it will be understood that variations and modifications can be effected within the spirit and scope of the invention as described hereinabove and as defined in the appended claims.

We claim:

1. A methine dye selected from those having the formulas: I.

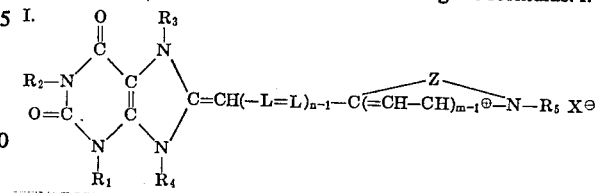

wherein $R_1$ represents an alkyl group having from one to three carbon atoms; $R_2$ represents an alkyl group having from one to three carbon atoms; $R_3$ represents an alkyl group having from one to three carbon atoms; $R_4$ represents an alkyl group having from one to 12 carbon atoms; L represents a methine group —CE = in which E is selected from the class consisting of hydrogen and an alkyl group having from one to four carbon atoms; n represents an integer of from one to four; Z represents the nonmetallic atoms required to complete a nucleus selected from the group consisting of a thiazole nucleus, a benzothiazole nucleus, a naphthothiazole nucleus, a thianaphtheno-7', 6',4,5-thiazole nucleus, an oxazole nucleus, a benzoxazole nucleus, a naphthoxazole nucleus, a selenazole nucleus, a benzoselenazole nucleus, a naphthoselenazole nucleus, a thiazoline nucleus, a pyridine nucleus, a quinoline nucleus, an isoquinoline nucleus, a 3,3-dialkylindolenine nucleus, an imidazole nucleus, a benzimidazole nucleus and a naphthimidazole nucleus; m represents an integer of from 1 to 2; $R_5$ represents an alkyl group having from one to five carbon atoms; and $X^-$ represents an anion; and

II.

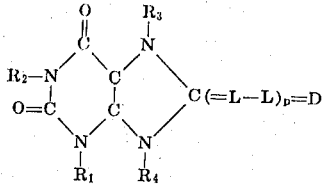

wherein $R_1$, $R_2$, $R_3$, $R_4$ and L are as defined previously; p represents an integer of from 1 to 3; and D represents an acidic nucleus selected from the class consisting of a 3-thietanone-1,1-dioxide, a rhodanine, a thiobarbituric acid, a barbituric acid, a 2thiohydantoin, a hydantoin, a 2-thio-2,4-oxazolidinedione, a 2-thazolin-4-one, a 2-pyrazolin-5-one, an isooxazolin-5-one, a 3,5-pyrazolidinedione, a 2-imidazolin-4-one, a 2-imidazolin-4-thione, a 2-imidazolin-4-selenone, a 1,3-cyclopentanedione, a 1,3-cyclohexanedione, a malononitrile, an ester of malonic acid, cyanoacetic acid, and an ester of cyanoacetic acid.

2. A methine dye having the formula:

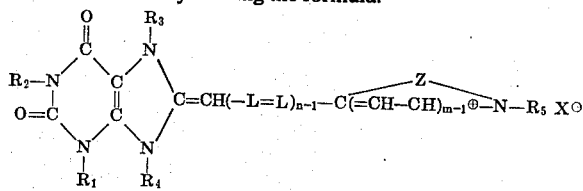

wherein $R_1$ represents an alkyl group having from one to three carbon atoms; $R_2$ represents an alkyl group having from one to three carbon atoms; $R_3$ represents an alkyl group having from one to three carbon atoms; $R_4$ represents an alkyl group having from one to 12 carbon atoms; L represents a methine group —CE   in which E is selected from the class consisting of hydrogen and an alkyl group having one to four carbon atoms; n represents an integer of from one to 4; Z represents the nonmetallic atoms required to complete a nucleus selected from the group consisting of a thiazole nucleus, a benzothiazole nucleus, a naphthothiazole nucleus, a thianaphtheno-7',6',4,5-thiazole nucleus, an oxazole nucleus, a benzoxazole nucleus, a naphthoxazole nucleus, a selenazole nucleus, a benzoselenazole nucleus, a naphthoselenazole nucleus, a thiazoline nucleus, a pyridine nucleus, a quinoline nucleus, an isoquinoline nucleus, a 3,3-dialkylindolenine nucleus, an imidazole nucleus, a benzimidazole nucleus and a naphthimidazole nucleus; m represents an integer of from 1 to 2; $R_5$ represents an alkyl group having from one to five carbon atoms; and $X^-$ represents an anion.

3. 3-Ethyl-1'3',7',9'iodide.

4. Anhydro-1',3',7',9'-tetramethyl-3-(3-sulfopropyl)-4, 5-benzothiaxantinocarbocyanine hydroxide.

5. 3-Ethyl-1',3',7',9'cyanine iodide.

6. 3-Ethyl-5-[(1,3,7,9-tetramethyl-8(9H)-xanthinylidene)ethylidene]rhodanine.

7. 3-Ethyl-5-[(1,3,7,9-tetramethyl-8(9H)-xanthinylidene)ethylidene]-2-thio-2,4-oxazolidinedione.

8. 3-Ethyl-5-[(1,3,7,9-tetramethyl-8(9H)-xanthinylidene)-2-butenylidene]rhodanine.

* * * * *

PO-1050
(5/69)

UNITED STATES PATENT OFFICE
CERTIFICATE OF CORRECTION

Patent No. 3,678,045     Dated July 18, 1972

Inventor(s) Earl J. VanLare and Leslie G. S. Brooker

It is certified that error appears in the above-identified patent and that said Letters Patent are hereby corrected as shown below:

Column 1, line 14, "diethyl-1',3',3'-iodide" should read --- diethyl-1',3',3'-trimethylbenzimidazoloindocarbocyanine ---.

Column 1, line 54, "-CE" should read --- -CE= ---.

Column 2, line 34, "X$^-$", should read --- X$^{\ominus}$ ---.

Column 2, line 36, "p", should read --- $\underline{p}$ ---.

Column 3, line 15, "increase -ethyl-", should read --- 3-ethyl- ---.

Column 3, line 50, "X$^-$", should read --- X$^{\ominus}$ ---.

Column 4, line 5, "X$^-$", should read --- X$^{\ominus}$ ---.

Column 4, line 16, "X$^-$", should read --- X$^{\ominus}$ ---.

Column 4, line 65, delete "crystalline dec.".

Column 5, line 14, "p", should read --- $\underline{p}$ ---.

Column 5, line 16, "malt", should read --- melt ---.

Column 5, line 34, "p", should read --- $\underline{p}$ ---.

Column 5, line 73, "p", should read --- $\underline{p}$ ---.

Column 6, line 17, "p", should read --- $\underline{p}$ ---.

Column 6, line 33, "p", should read --- $\underline{p}$ ---.

Column 6, line 48, "p", should read --- $\underline{p}$ ---.

UNITED STATES PATENT OFFICE
CERTIFICATE OF CORRECTION

Patent No. 3,678,045               Dated July 18, 1972

Inventor(s) Earl J. VanLare and Leslie G. S. Brooker

It is certified that error appears in the above-identified patent and that said Letters Patent are hereby corrected as shown below:

Column 6, line 65, "p", should read --- $\underline{p}$ ---.

Column 7, line 6, "p", should read --- $\underline{p}$ ---.

Column 7, line 25, "p", should read --- $\underline{p}$ ---.

Column 7, line 41, "p", should read --- $\underline{p}$ ---.

Column 9, line 45, that part of table which reads

"| Dye of Example | Silver Halide Emulsion |
| --- | --- |
| 8 | do |
| 9 | Silver chloride |
| 10 | do |
| 11 | do |
| 12 | do |
| 13 | Silver bromoiodide" | should read ---

| Dye of Example | Silver Halide Emulsion |
| --- | --- |
| 8 | do |
| 9 | Silver chloride |
| 10 | do |
| 11 | do |
| 12 | do |
| 13 | Silver bromoiodide --- . |

UNITED STATES PATENT OFFICE
CERTIFICATE OF CORRECTION

Patent No. 3,678,045  Dated July 18, 1972

Inventor(s) Earl J. VanLare and Leslie G. S. Brooker

It is certified that error appears in the above-identified patent and that said Letters Patent are hereby corrected as shown below:

Column 9, line 75, "
```
            Sensitization "
    Dye     Max. in mµ
    A 550
``` should read ---
```
            Sensitization
    Dye     Max. in mµ
    A           550 ---
```

Column 10, line 1, "2 550", should read --- 2     550 ---.

Column 10, line 15, "
```
            Sensitization"
    Dye     Max. in mµ
    B 530
    4 530
``` should read ---
```
            Sensitization
    Dye     Max. in mµ
    B           530
    4           530 ---
```

Column 10, line 30, "
```
            Sensitization"
    Dye     Max. in mµ
    C 630
    13 630
``` should read ---
```
            Sensitization
    Dye     Max. in mµ
    C           630
    13          630 ---
```

UNITED STATES PATENT OFFICE
CERTIFICATE OF CORRECTION

Patent No. 3,678,045   Dated July 18, 1972

Inventor(s) Earl J. VanLare and Leslie G. S. Brooker

It is certified that error appears in the above-identified patent and that said Letters Patent are hereby corrected as shown below:

Column 12, line 4, "p-toluenesulfonate, 4-vinylpyridine polymer metho-p-", should read --- p-toluenesulfonate, 4-vinylpyridine polymer metho-p- ---.

Column 13, line 7, "X⁻", should read --- $X^{\ominus}$ ---.

Column 13, line 21, "2-thazolin", should read --- 2-thiazolin ---.

Column 14, line 6, "CE", should read --- CE= ---.

Column 14, line 20, "X⁻", should read --- $X^{\ominus}$ ---.

Column 14, line 21, "3-Ethyl-1'3',7',9'iodide", should read --- 3-Ethyl-1',3',7',9'-tetramethylthiaxanthinocarbocyanine iodide ---.

Column 14, line 25, "3-Ethyl-1',3',7',9'cyanine", should read --- 3-Ethyl-1'3',7',9'-tetramethylthiaxanthinodicarbocyanine ---.

Signed and sealed this 20th day of February 1973.

(SEAL)
Attest:

EDWARD M. FLETCHER, JR.
Attesting Officer

ROBERT GOTTSCHALK
Commissioner of Patents